United States Patent [19]
Ng

[11] Patent Number: 5,971,855
[45] Date of Patent: Oct. 26, 1999

[54] APPARATUS AND METHOD OF COMMUNICATING BETWEEN ELECTRONIC GAMES

[75] Inventor: Victor Ng, Kin, The Hong Kong Special Administrative Region of the People's Republic of China

[73] Assignee: Tiger Electronics, Ltd., Pawtucket, R.I.

[21] Appl. No.: 08/940,688

[22] Filed: Sep. 30, 1997

[51] Int. Cl.[6] .......................................................... A63F 9/22
[52] U.S. Cl. .................................... 463/42; 463/40; 463/7
[58] Field of Search .................................. 463/42, 40, 41, 463/43, 44, 7; 273/148 B

[56] References Cited

U.S. PATENT DOCUMENTS

| | | | |
|---|---|---|---|
| 4,570,930 | 2/1986 | Matheson | 463/41 |
| 4,802,879 | 2/1989 | Rissman et al. | |
| 4,813,907 | 3/1989 | Rissman et al. | |
| 5,048,831 | 9/1991 | Sides | |
| 5,161,803 | 11/1992 | Ohara | 273/434 |
| 5,428,528 | 6/1995 | Takenouchi et al. | 463/42 |
| 5,572,646 | 11/1996 | Kawai et al. | |
| 5,618,045 | 4/1997 | Kagan et al. | 463/40 |
| 5,643,088 | 7/1997 | Vaughn | |

OTHER PUBLICATIONS

1986 Activision Home Computer Software product insert "Little Computer People Discovery Kit", Dec. 7, 1998.

*Primary Examiner*—Jessica J. Harrison
*Assistant Examiner*—Shelia Clayton
*Attorney, Agent, or Firm*—Fitch, Even, Tabin & Flannery

[57] ABSTRACT

An apparatus and method for communicating between a hand-held electronic game apparatus and other electronic systems is described. Small hand-held electronic games, preprogrammed with a single game, may be linked together through a communications unit to engage in interactive gaming between two users. Alternatively, the communications unit can be connected via a special cable connected to the serial port of a personal computer to permit connection to a central processing unit on an Internet website. The website central processing unit can modify the preprogrammed game, provide upgrades to the game, unlock hidden features and simulate a second hand-held electronic game apparatus for interactive play with a user. Software is installed on the personal computer permits communication between the hand-held electronic game and the personal computer, between the PC and the Internet website and thus between the hand-held game and the Internet website. Data from the hand-held game can be communicated to the Internet website, for example, to register high scores, or to play the preprogrammed game with other game users connected to the website.

31 Claims, 7 Drawing Sheets

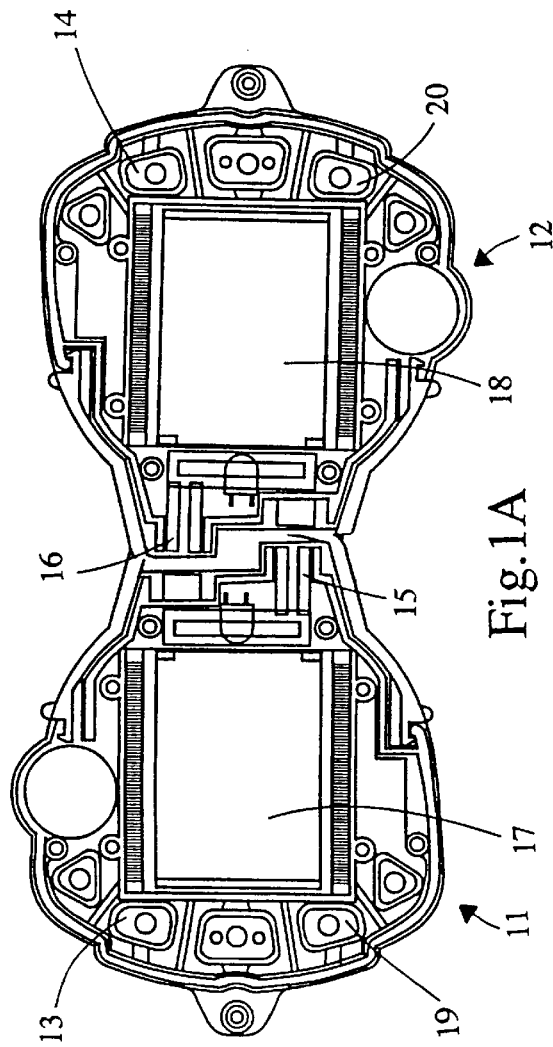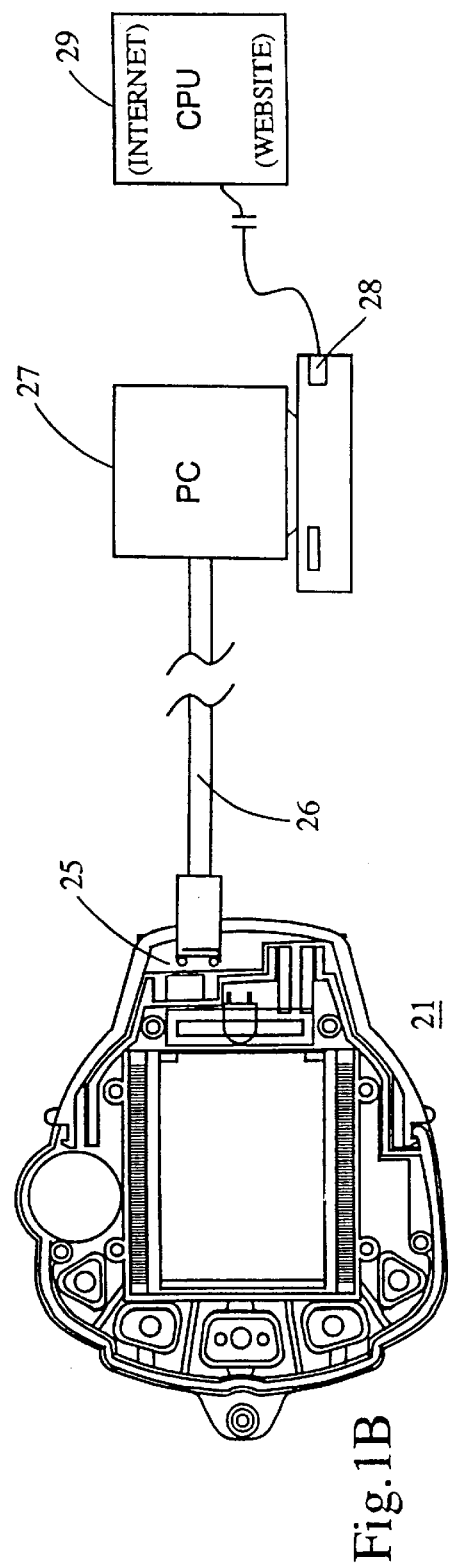

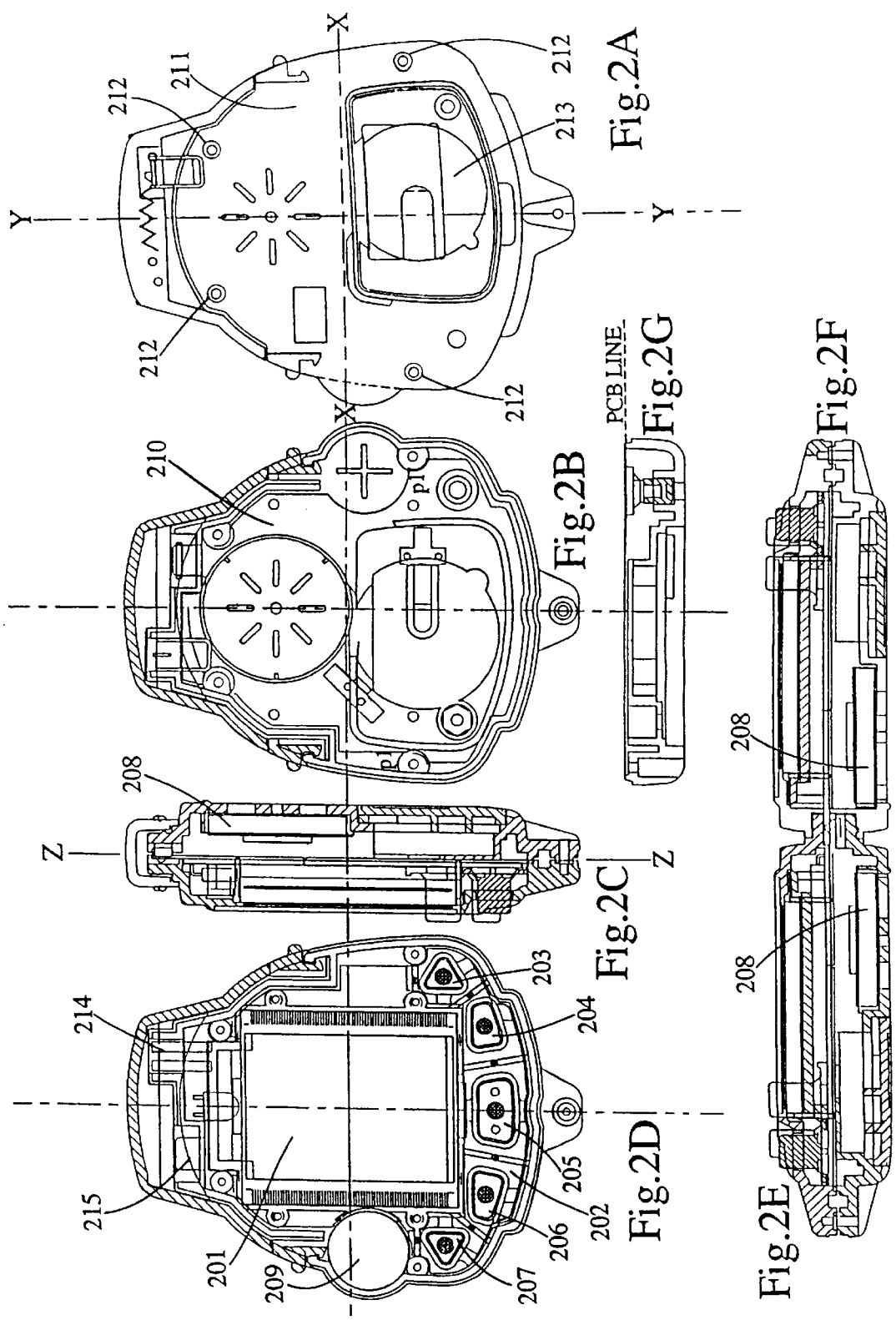

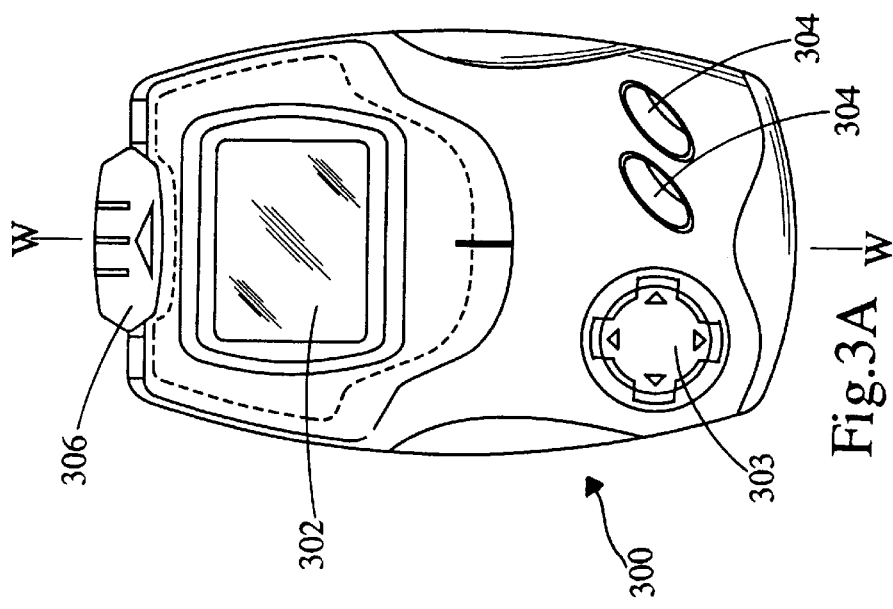
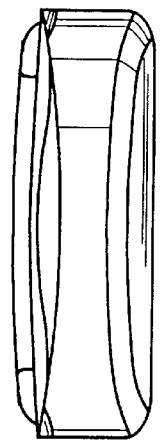
Fig.3A
Fig.3D
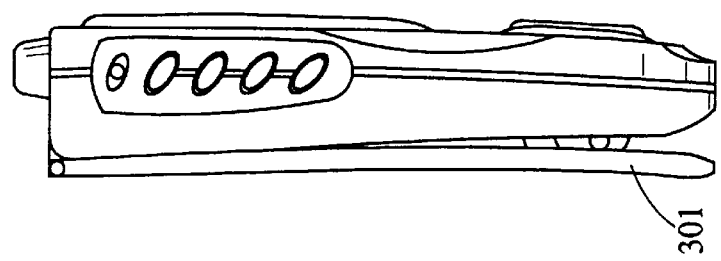
Fig.3B
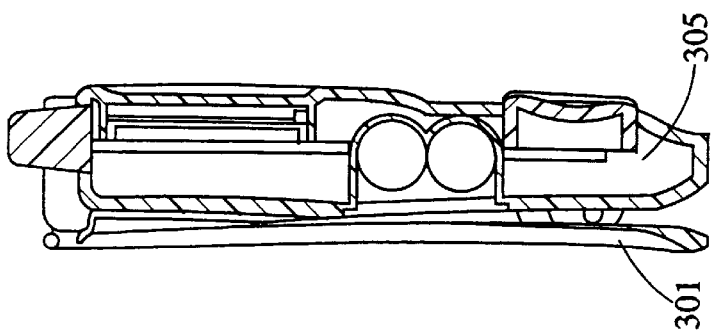
Fig.3C

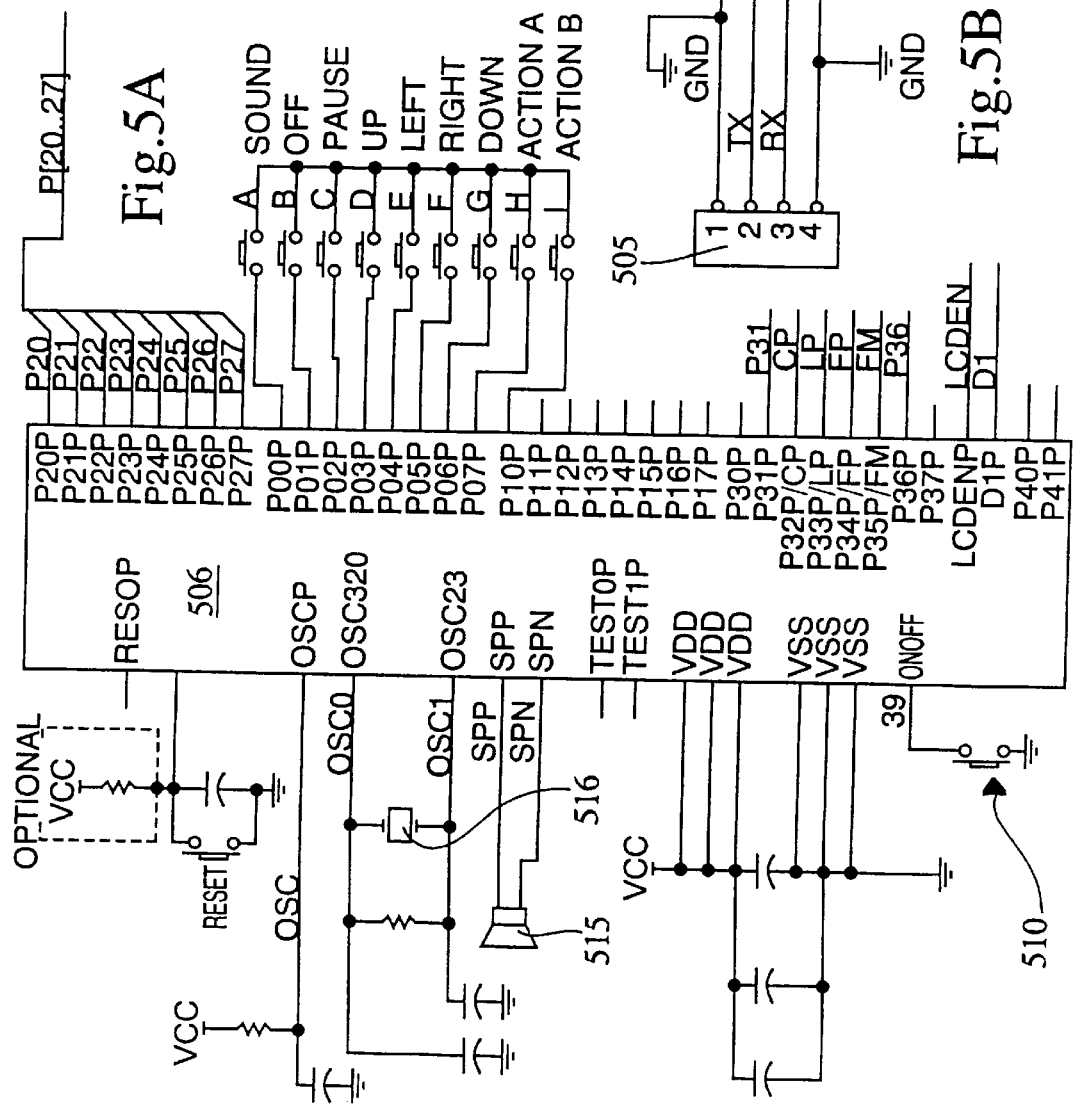

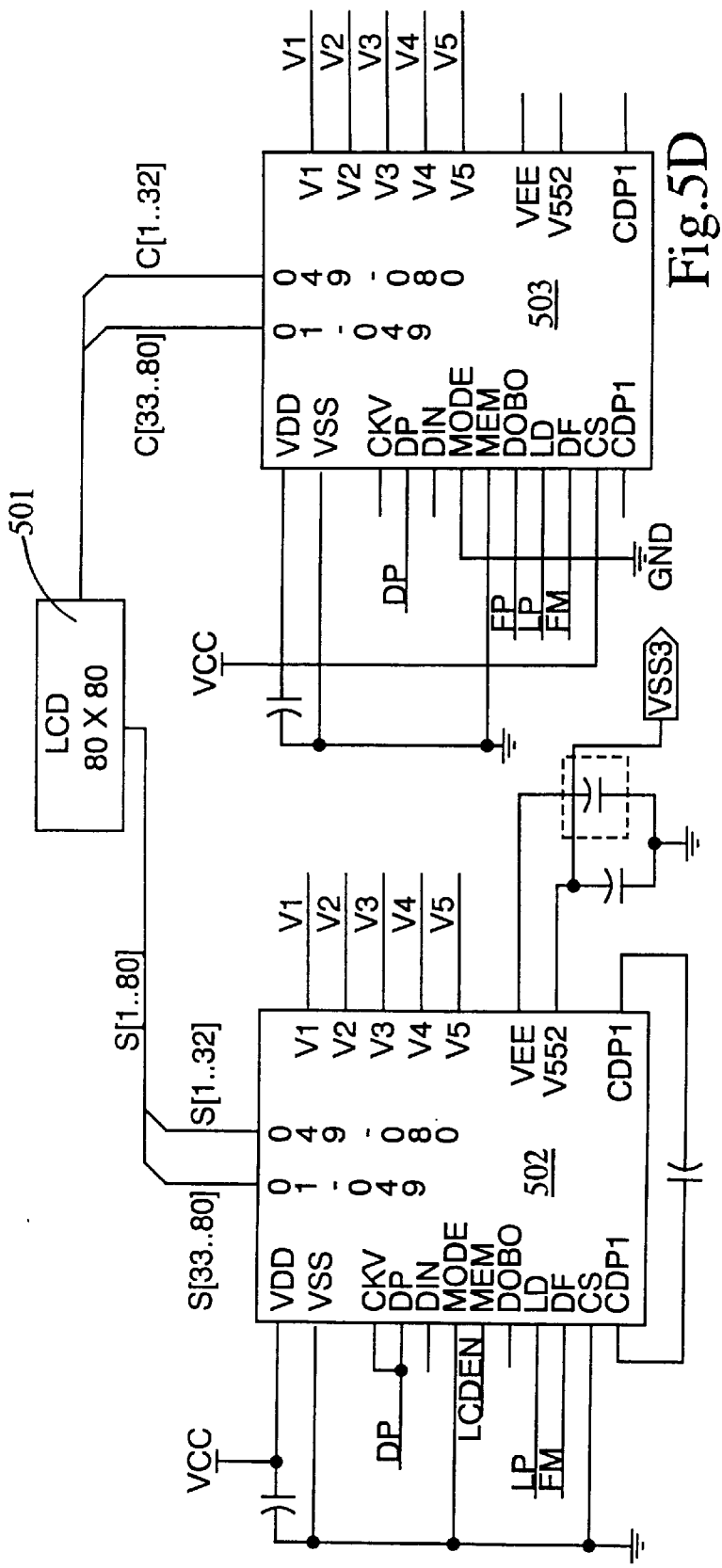
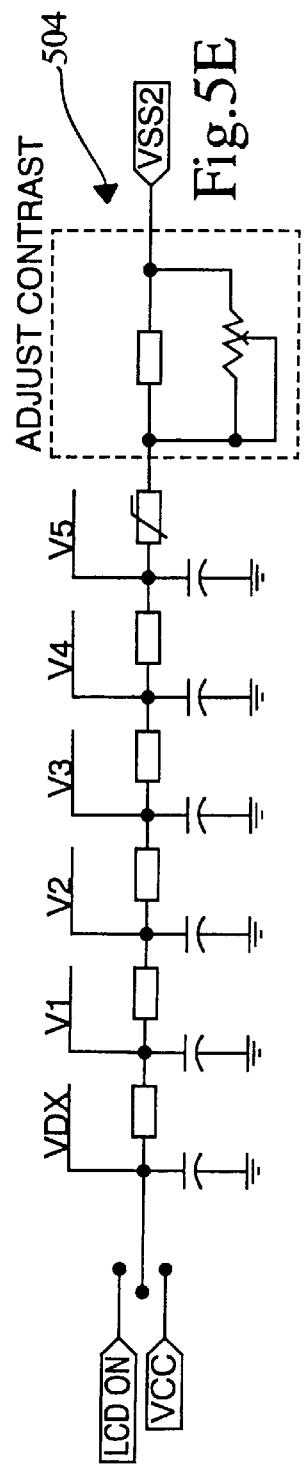
Fig.5D
Fig.5E

APPARATUS AND METHOD OF COMMUNICATING BETWEEN ELECTRONIC GAMES

BACKGROUND OF THE INVENTION

This invention relates to apparatus and method of communicating between a hand-held electronic game apparatus and other electronic systems.

Inexpensive, hand-held electronic games have become more popular as the complexity and increasing costs of the cartridge-style video games, games in which the user can play more than one game by replacing a game cartridge in the game unit, have increased. Additionally, while users enjoy the low cost of single game electronic game, users have grown to expect features of the higher priced and more complex games to be included in the less expensive units.

Some of the features sought after by users include access to upgrades to lengthen the life of the electronic game, hidden features and functionality, and the ability to engage in multi-user game play. The advent and increased popularity of the Internet in homes has made multi-user game play with remote users and access to manufacturer web pages as close as the family personal computer.

Increased miniaturization and reductions in manufacturing costs in the semiconductor industry have made more sophisticated games possible for the hand-held electronic game apparatus industry possible. An example of such an improved hand-held electronic game is described in co-pending application, assigned to the assignee of this invention, entitled "Electronic Game" application Ser. No. 08/940,732 filed Sep. 30, 1997, which is incorporated herein by reference and made a part of this application. However, even with such improvements, the memory available for such hand-held games, often no larger than a key fob or pocket watch, is insufficient to include the additional software needed to provide the increased functionalities sought. Such simple games do not contain the additional software or hardware needed to link with other games.

Examples of previous efforts to link game apparatuses are known in the prior art. For example, Sides U.S. Pat. No. 5,048,831 discloses a hand-held electronic game apparatus useable by a single player, but also useable for direct competitive play between two or more players through both direct physical linkage of multiple units of the apparatus and indirect linkage by radio signals or the like. The electronic apparatus of Sides is designed for larger, more complex games and requires a communications link be built into each electronic game apparatus. Further, the electronic game apparatus of Sides contemplates operating on larger power supplies such as 12 volt batteries or common household AC current, which is far greater than the typical 3 volt battery power supplies used in inexpensive, hand-held electronic game apparatuses.

Vaughn et al. U.S. Pat. No. 5,643,088 discloses a game of skill or chance playable by remote participants in conjunction with a common game event including inserted interactive advertising. This system requires communication with a remote central computer and does not permit game play between two or more users directly.

There is thus a need for an apparatus and method for communicating between a hand-held electronic game apparatus and other electronic systems.

SUMMARY OF THE INVENTION

To achieve the foregoing and other objects, a hand-held electronic game apparatus for interactively playing a preprogrammed game according to the invention includes a communications unit for connecting either directly with another hand-held electronic game apparatus or indirectly with a central processing unit. An example of a hand-held electronic game is the GigaPets™ manufactured and sold by Tiger Electronics, Inc., the assignee of this invention. The GigaPets are more particularly described in co-pending application entitled, "Electronic Game", application Ser. No. 08/940,732, filed Sep. 30, 1997, which is assigned to the assignee of this invention, the disclosure of which is incorporated herein by reference.

The hand-held electronic game apparatus described in application Ser. No. 08/940,732, filed Sep. 30, 1997 are generally the size of a key fob or pocket watch and play a single preprogrammed game. The apparatus includes a game display for displaying graphics and text images, a keyboard input with a plurality of keys for inputting data and commands by a user. The apparatus is powered by a small, low-voltage battery or other power supply. A controller or processor receives, processes and controls the input and output of data, graphics and text images on the display and control signals during play of the preprogrammed game. The preprogrammed game is stored on a memory, usually an electrically erasable programmable memory. A small, secondary memory (RAM) stores temporary data generated during play of the preprogrammed game. An audio means includes a speaker for generating audio output during play of the game and a microphone for receiving user audio input during play of the game. The preprogrammed game enables the user to generate, uniquely identify and control a plurality of game functions. Typically, the game functions include a pet, such as a dog or a cat, but may also include a fighter or circus performer or other character or activity.

Each apparatus includes a communications unit for enabling the apparatus to communicate with another electronic system. Two electronic game apparatuses may be linked directly together through their communications units enabling joint play of the preprogrammed game. Alternatively, the electronic game apparatus may be linked via a cable to a personal computer and then from the personal computer over a modem connection to a Website on the Internet. From the Website, a central processing unit can download upgrades to the preprogrammed game, unlock hidden features in the preprogrammed game or connect the user to other users similarly connected to the Website. The central processing unit can also simulate the preprogrammed game to enable the user to play the central processing unit.

Access to the Website will enable users to receive upgrades to the preprogrammed game, compete against the "computer" and other users, have their scores posted, have the computer unlock hidden features in the preprogrammed game. For preprogrammed games in which the user raises a virtual pet, such as dog, the user can also access the Website to vary characteristics of the pet. For example, the computer at the Website can restore a pet's health, change the pet's age and weight and even perform some training (or behavior modification). By being able to link their electronic game apparatuses to other electronic systems, including a Website and other electronic game apparatuses, users will receive increased benefit and enjoyment from their electronic game apparatuses.

BRIEF DESCRIPTION OF THE DRAWINGS

FIG. 1A is a block diagram of two electronic game apparatus linked to each other according to the invention.

FIG. 1B is a block diagram of an electronic game apparatus linked via a cable to a personal computer and then to a Website on the Internet.

FIGS. 2a–2g are an expanded view of an electronic game apparatus according to the invention.

FIGS. 3a–3d and 4a–4d show views of an alternate design of an electronic game apparatus according to the invention.

FIG. 5 is a schematic of an electronic game apparatus according to the invention.

DETAILED DESCRIPTION OF THE PREFERRED EMBODIMENT

Figure 4C:
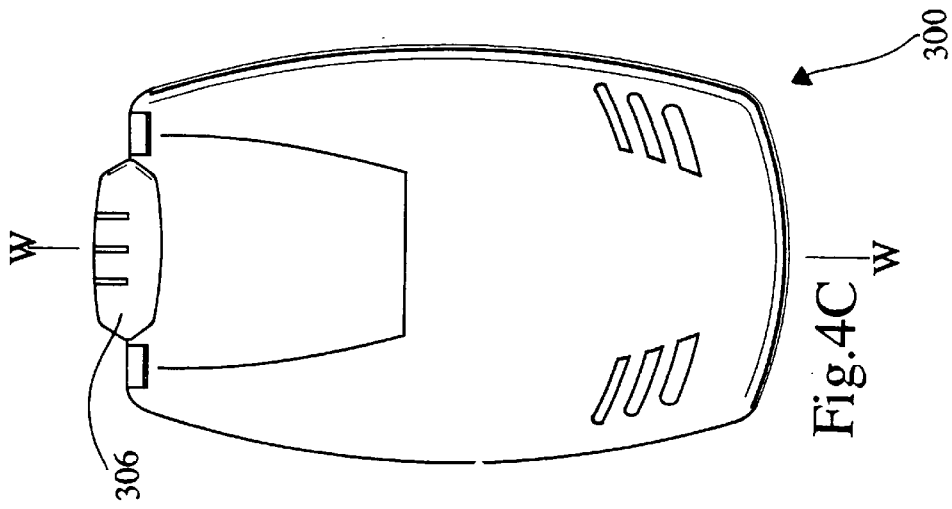
Figure 4A:
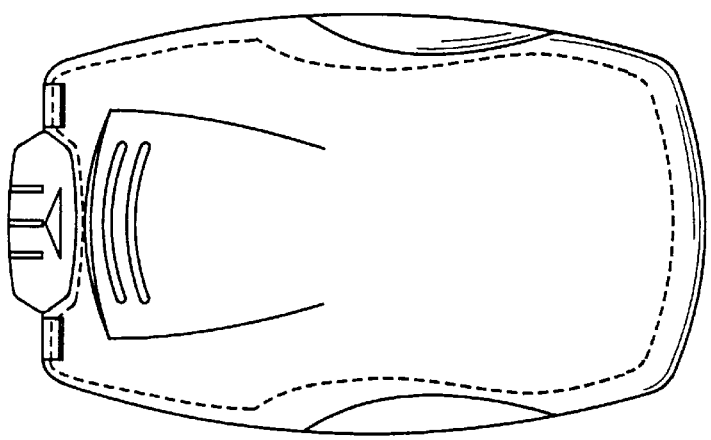

Referring to FIG. 1A, hand-held electronic game apparatuses 11 and 12 (bottom view) are shown linked directly together at communication links 15 and 16 for interactive play. Communication links 15 and 16 are four pin connectors. In operation, each user sets up his respective electronic game to interact with the other game, by pushing his respective Mode Button 13, 14 on the keyboard until "Fighting" or other appropriate command appears on Display 17, 18. When the two games are linked together, each user selects the "Fighting Request" by pushing his respective Enter Button 19, 20. Characters from each electronic game then "fight" or otherwise appropriately interact each other. A message flashes on both displays when one Character "wins." It should be noted that not all characters will "fight." Some preprogrammed games may involve fighters that will engage in battle. Other games may involve competitions in which one character has a higher score for some attribute. For example, when two dogs compete, one dog may win over another dog if the first dog has a higher training score than the other dog. An audio signal from the speaker (not shown) may also announce the winning Character.

Referring to FIG. 1B, the preferred embodiment in which hand-held electronic game 21 is connected to a personal computer 27 is shown. In this embodiment, interactive software has been installed on personal computer 27. The interactive software includes the protocol used for communicating over the Internet. Game 21 is connected through cable 26. Cable 26 connects to game 21 at its communications unit, 4 pin connector 25, and to serial port 31 on personal computer 27. The software loaded on PC 27 may provide additional play options not available to game 21 due to memory limitations in the unit. Once connected, the user may dial into an Internet Website 29 via modem 28.

In addition to being directly connected as shown in FIG. 1A, two games 200 may communicate and interact with each other through personal computers (not shown). In this embodiment, each user would connect his game to a cable, then his cable to his personal computer. The personal computers are then connected via a RS-232 serial port. However, it is expected that most users will prefer to use the personal computer connection to connect with other users on the Internet or to connect with a game website on the Internet.

By connecting to a game Website on the Internet through a modem or other communication means, the user can access many activities designed to increase enjoyment of the game. For example, the Website can download upgrades or modify the preprogrammed game. The Website can interact directly with the preprogrammed game, such as by unlocking hidden features in the preprogrammed game or by modifying attributes of the game character.

The Website can check the user's character's name and verify the highest score achieved among all such characters. The Website and turn on or off certain hidden features (such as enabling the user to save his games or change the speed of time in the game). The Website can cure any character to perfect health, grow or change any character's health, provide enhanced training. The Website can send messages or greeting screens to the character. The Website can simulate another character (new or old) to interact (or fight) with the user's character. The Website can connect two users and enable their characters to interact (or fight). The Website can make the user's character perform new tricks for added fun and enjoyment.

Referring to FIG. 2, a hand-held electronic game apparatus 200 is shown in a series of assembly-type drawings. Apparatus 200 is a preferred embodiment of a hand-held electronic game apparatus in which a single preprogrammed game includes means for generating, uniquely identifying and controlling a plurality of separate game functions or characters. For a GigaPet type electronic game apparatus, the separate game functions or characters include a virtual pet, such as a dog or cat, a fighter, circus performer or management of a small farm with different animals. Further details of the operation of the preprogrammed game may be found in co-pending application 61462, incorporated by reference herein.

In FIG. 2, the same numerals refer to the same element in each view. FIG. 2A is a bottom view of the front exterior of a hand-held electronic game 200. FIG. 2B is a cross-section along line Z—Z; FIG. 2C is a vertical cross-section along line Y—Y; FIG. 2D is a cross-section along line Z—Z. FIGS. 2E–2F are side cross-sections along line Y—Y. FIG. 2G is a cross-section along line X—X.

Game 200 includes game display screen 201, keyboard input 202 consisting of five keys: left 203, mode 204, light on/off 205, enter 206, right 207. Speaker 208 provides audio output to the user during play of the preprogrammed game. Microphone 209 receives audio input from the user during appropriate portions of the preprogrammed game. Top housing 210 is connected to bottom housing 211 via screws 212. Game 200 is powered by 3 volt battery 213. A single ASIC chip contains the processor, first memory and second memory. The processor accesses the preprogrammed game from the first memory and receives, processes and outputs data, graphics and text images to the display and control signals during operation of the preprogrammed game. Temporary data, such as scores, condition of the Pet are stored in second memory. Communications unit, a four pin connector and socket 214, 215 enable communication between game 200 and another electronic system.

FIG. 3 is an alternative embodiment of a hand-held electronic game according to the invention. In this embodiment, game 300 includes a cover 301 which is flipped back during play of the preprogrammed game. FIG. 3A is an open top view of game 300, FIG. 3B a side view with the cover flipped back, FIG. 3C a section view along line W—W and FIG. 3D a front view. With cover 301 flipped back, display 302 is revealed. The user controls play of the game by accessing the keyboard elements: left 303, mode 304, enter 305, right 303. The left/right button is shown in a single thumb operated switch; pressing to the left side moves the character left; pressing to the right side moves the character right. Speaker 305 generates audio signals. Communications unit 306 enables linking directly with another hand-held electronic game or via cable to a personal computer.

Figure 4D:
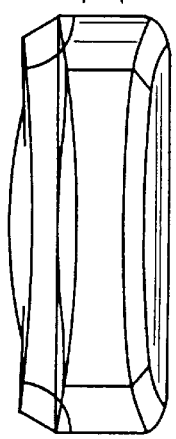
Figure 4B:
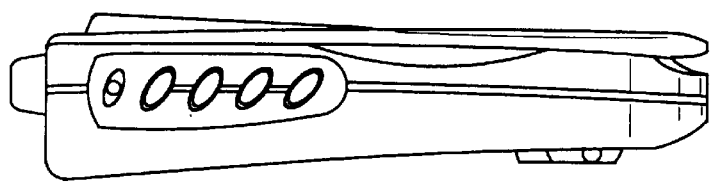

FIG. 4 shows hand-held electronic game 400 in back view (FIG. 4C), side view along line W—W with cover closed (FIG. 4B), top view with cover closed (FIG. 4A) and front view with cover closed (FIG. 4D).

Referring to FIG. 5, a schematic of the circuitry of a hand-held electronic apparatus is show. The user turns on the apparatus by depressing on-off switch 510, which is connected to microprocessor 506, preferably a SPL128 at pin 39. Microprocessor 506 (LCDEN at pin 40) supplies power to display 501, an 80×80 LCD, through voltage divider 504 via LCD Driver 502 (pin 48). LCD Driver 502 provides vertical signals and LCD Driver 503 provides horizontal signals to display 501. Audio signals are output through speaker 515, which is controlled through microprocessor 506 at pins 78 and 79. Audio input signals from the user to modify game play are received through microphone 516 to microprocessor 506 at pins 31 and 34. Keyboard commands are input through switches A through I to microprocessor 506 at pins 73–66. DC power is supplied through power supply 520.

Commands from an external electronic apparatus are input through connector 505, a four pin connector. Pins 1 and 4 are ground. Signals from an external electronic apparatus are received through pin 3 of connector 505 and transmitted through ASIC 507 through pins P20–P27 to microprocessor 506.

Signals from the hand-held electronic apparatus are transmitted to the external electronic apparatus through pin 2 of connector 505.

Figure 6:
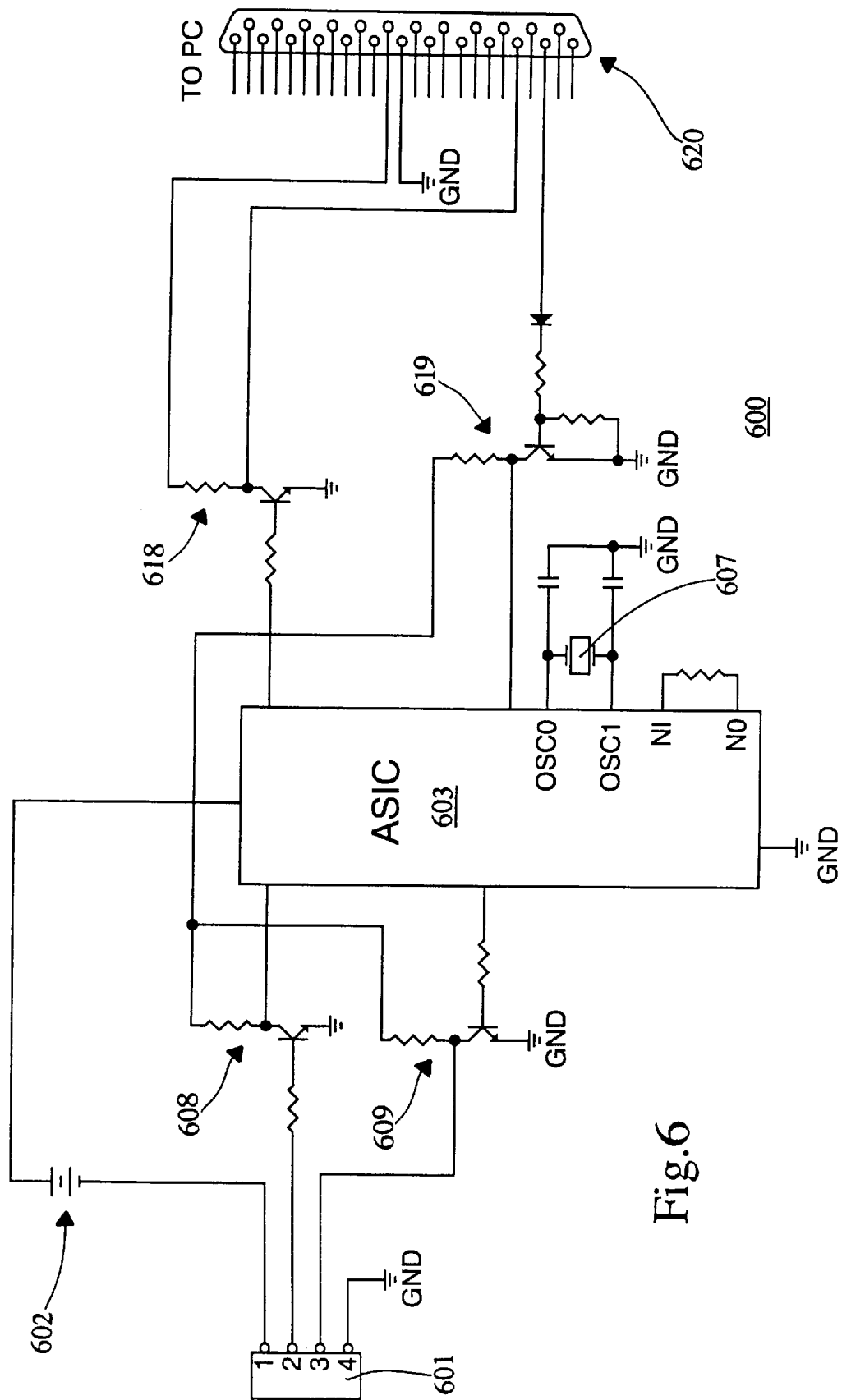
FIG. 6 is a schematic of a cable for linking an electronic game apparatus to a personal computer.

Referring to FIG. 6, a schematic of a cable 600 for connecting a hand-held electronic game apparatus to a personal computer is shown. A four pin connector 601 connects to a hand-held electronic game apparatus through controller 603, preferably an ASIC, to serial port cable 620, which is then connected to the serial port of a personal computer. Cable 600 is powered by DC power supply 602 (two AAA batteries). Signals from cable connector pin 2 are amplified at amplifier 608 before being applied to controller 603. Signals leaving controller 603 are amplified at amplifier 609 before being output through connector pin 3. Oscillator 607 provides the signal for the internal cable clock. Similarly signals to and from serial port cable 620 are amplified at amplifiers 619 and 618 respectively.

Fighter. An example of a preprogrammed game in which the user cares for a character which can interact with other similar characters in an electronic system is called Fighter. The object of this game is to train the fighters in various fighting techniques, then challenge another user to head-to-head combat. Details of the electronic game are disclosed in applicant's co-pending application Ser. No. 08/940,732, filed Sep. 30, 1997. The user may train up to four fighters at a time, with the active fighter being in the foreground and the other fighters in the background. Alert functions tell the user which fighter needs attention.

Each fighter has three "wellness" statistics: health, training, and discipline. Scores range from 0 to 100. Health is an indication of how healthy the fighter is. If health drops to 0, the fighter dies. Each fighter begins the game with a health of 80. Training is an indication of how well the user cares for the fighter. If the user performs all the correct activities at the correct time, the fighter's training score will increase. If the fighter misses a training activity, his training score decreases. Each fighter begins the game with a training score of 0. Discipline is an indication of the fighter's temperament. A discipline score of 0 means a lazy or bad fighter. A discipline score of 100 represents a hardworking fighter. Each fighter begins the game with a discipline score of 50.

Each fighter has three "rank" statistics: strength, agility, and willpower. The rank stats are used to determine who wins when the user's fighter meets another user's fighter in combat. Rank stats range from 0 to 100. When the game starts, each fighter has all rank stats set at 50. Strength represents the fighter's ability to win by sheer brute force (STAT A). Agility represents the fighter's ability to dodge, duck and out-move his opponent (STAT B). Willpower represents the fighter's determination and will to win (STAT C).

Each fighter also has an age, weight and total score. Age starts at 16 and has no upper limit. Weight starts at 100 and has no upper limit. Total score is the average of Health, Training, Discipline, Strength, Agility and Willpower and ranges from 0 to 100.

Master command LCD icons (activity symbols displayed on the LCD display) for the Fighter include Feed (fork/knife), Spar (boxing glove), Doctor (cross), Shower (shower), Sleep (moon), Discipline (whistle), Fight (two fists), Command Mode ("Shout"), Score (scale), Alert (alert). Similarly, Fighter includes a real-time clock, Naming feature and high score and name retention feature. In addition to beeps and other notification sounds, the game will play sound effects such as eating, yelling and grunting. Sound can be turned on and off. Keyboard includes five keys: Left, Mode, Light On/Off, Enter, Right.

When the game is first activated, the clock must be set. Clock mode is selected by pressing Mode then Enter. Left key sets hour, Right key sets minutes, Enter to set the time. Then the user must name the fighter, using the Left/Right keys to move through the alphabet to choose a name. Once clock and name are set, the game mode begins. Game mode begins with a "welcome" animation where the fighter goes through a few of his moves.

Now the user must care for and train his fighter. The object of the game is to give the fighter the right kind of training so he can defeat other fighters. The user must Feed the fighter. The fighter can be fed either Proteins (the icon looks like a steak) or Carbs (the icon looks like a loaf of bread). The user must Train his fighter. Train is selected from the Menu by pressing Mode then Enter when Train is highlighted. When reaching the Train Menu, four options are possible: Strength, Agility, Willpower, and Spar. If Train is selected and any of the four activities is selected and completed (whether successfully or not), the fighter earns one point on his Training score. If the training activity is not completed for any reason, one point is deducted from the fighter's Training score.

The Strength activity is a weightlifting game. The user must press the Left and Right keys alternately to successfully lift the weight. If the user presses the same key twice in a row, the fighter will falter and the weight will sink down. The fighter has a time limit to successfully lift the weight. If time runs out, the fighter fails and one point is deducted from Health. The trick is to lift the weight quickly by successfully alternating the Left/Right keys. This game is played five times and each time the weight is increased. Weight starts at 200 pounds, then increases 50 pounds each stage. At the end of each successful stage, the fighter's Strength score in increased by one point. However, Strength can never exceed 80.

Agility is a dodging game. Someone off screen shoots arrows at the fighter, who must dodge out of the way by ducking, jumping, or striking the arrow aside. The arrows comes from either the right or the left and can be aimed high, low or in the middle. Pressing Left ducks the high arrows; pressing Right jumps the low arrows; pressing Enter strikes aside the middle arrows. Failure to time the movement correctly costs the fighter one Health point. Only 5 arrows are shot; each successive arrow moves faster and the time to react decreases. Each arrow avoided gives the fighter a one point increase in Agility, but this activity never takes Agility over 80.

In the Willpower activity, the fighter is shown with his arms outstretched holding two heavy buckets of water. If the fighter drops the bucket and spills any water, he fails. If the user sees the fighter's left arm getting weaker, the user must press the Left key to steady him. If his right arm gets weaker, the user must press the Right key to steady him. Each time the user's opportunity to react gets shorter, but control must be maintained for about seconds or the fighter fails and loses one point in Health. Each four seconds completed earn one point in Willpower. Willpower cannot be raised over 80 points.

In the Spar activity, the fighter is pitted against a computer controlled opponent. The computer's built in Stats are randomly generated from 30 to 80 points in each category. (See combat description below.)

Care of the fighter includes visits to the Doctor. Going to the Doctor will increase the fighter's Health score by one point, but the fighter can only visit the Doctor once per day. Too many visits will cause the controller to deduct one point from Discipline each time. The fighter should clean up (Shower) at regular times. Activities such as Feed, Train and Combat will make the fighter need Showers more often. When the fighter needs to sleep, the user should turn out the light. When the fighter's Discipline gets low, this activity will bring him back on track. The Fight icon will operate only when the fighter is linked to another fighter or the Tiger Website. Command Mode is used to toggle voice command on and off. Score Mode brings up the fighter's name, age, weight and all Stats. The Alert icon lights up when the fighter needs something. If the fighter needs something and the user gives him the correct thing at the right time, the fighter's Health and Training are both increased by one point. The game is over when the fighter dies of bad health (Health drops to 0) or retires due to old age (30, unless the fighter's Health is 95 or above, then he will live for an additional day).

Combat. When two games are linked (either directly or via a PC connection to the Internet Website) together for combat play, each user has the choice of acting first, or waiting for his opponent to act (either another user via the link, or the Tiger Website's "sparring partner"). Each fighter acts by choosing a fighting maneuver to use on his opponent. Pressing Left key chooses the Strength move, pressing Right key chooses the Agility move, pressing Enter chooses the Willpower move. The fighter who goes first will be seen by both users to start his move. This gives the other user a brief moment to react with the correct counter move. The fighter who goes first gets an initial combat value equal to the Stat he chooses; he can receive from 1 to 5 points for his move (randomly generated) and 5 points for acting first. The other fighter gets an initial combat value equal to the Stat he chooses, from 1 to 5 points (randomly generated). The combat values are then adjusted according to the type of move chosen. A Strength move receives double value against a Willpower move. An Agility move receives double value against a Strength move. A Willpower move receives double value against an Agility move. This is the same as the "Rock-paper-scissors" method. In other words, Strength will usually beat Willpower, Agility will usually beat Strength, and Willpower will usually beat Agility.

When the fight is over, the computer awards a bonus based on the relative Stats of the two fighters. If a fighter loses, he always gets one point deducted from Health. Then the computer compares the Stats chosen. If a fighter's Stat is higher than his opponent's Stat and the fighter won, the fighter gets one point added to his Health. If the fighter's Stat is higher and he lost, he gets one point deducted from his Health. If the fighter's Stat is lower and he loses, he gets one point added to Training. If the fighter's Stat is lower and he wins, he gets one point added to both the Stat he chose and the Stat chosen by his opponent. For example, suppose Bob (Strength of 80, Agility of 40 and Willpower of 55) fights the Tiger computer (randomly generated Strength of 80, Agility of 40 and Willpower of 30) and Bob waits for the computer to move first. The computer will go for a Strength move (its highest score). Assume Bob successfully reacts with an Agility maneuver. Bob's combat value is 40 (Agility) plus 5 (randomly generated), or 45. Hal's combat value is 80 (Strength) plus 5 for going first plus 1 (randomly generated), or 96. Since Bob chose the correct "counter move" against Hal, Bob gets his score doubled to 90 and wins the combat. Bob also gets a one point increase in both Agility and Strength.

If the communications link is broken during combat, the match is a draw. Since the Tiger computer matches Stat A against Stat B and Stat C in accordance with the "Rock, Paper, Scissors" algorithm, it is possible for a Fighter to engage in combat with another character, such as a Dog with Stat A (Size), Stat B (Intelligence) and Stat C (Energy). Additionally, the Tiger computer could match other characters with Stats A, B and C.

When the electronic game apparatus of the invention is linked through a cable to a serial COM port of a personal computer, separate software is installed on the personal computer or contained in the controller of the cable. The separate software enables the electronic game apparatus to communicate to a central computer, such as on the Tiger Website via the Internet. The separate software is loadable on a personal computer, and thus limited only by the memory resources of the personal computer and not the EEPROM on the electronic game apparatus. The separate software will contain the Internet protocol software. The preferred data format is 1 start bit, 8 data bits, no parity and one stop bit through an asynchronous RS-232C port with a minimum speed of 1200 bps.

The commands are typically of one byte length. Some commands may have data parameters follow. The lower six bits are used for command and the upper two bits to specify Reserved, Write, Read, or Send.

The general command format for a GigaPet™ electronic game apparatus is:

| Bit 7 | Bit 6 | Bit 5–0 | Remarks |
|---|---|---|---|
| 0 | 0 | Command | Reserved |
| 0 | 1 | Command | Write/Set |
| 1 | 0 | Command | Read |
| 1 | 1 | Command | Send |

Examples of commands include:

```
Command :   TYPE
Code    :   XX00 0001
            READ TYPE (Link request)
            Code    :   1000 0001 + byte + 0000 0000
                        (total 11 bytes) + CKS
            Remarks :   To get the model and revision
                        info, CKS is checksum byte, byte is
                        sender's ID (type)
```

|  |  |  |
|---|---|---|
| | SEND TYPE (Link Acknowledge) | |
| Code | : | 1100 0001 + byte1 + byte2 + 0000 0000 (10 bytes) + CKS |
| Remarks | : | Where byte1 = sender's ID byte2 = ID echo of the other apparatus |
| Command | : | NAME |
| Code | : | XX00 0010 |
| | WRITE NAME | |
| Code | : | 0100 0010 + Name (12 characters) + CKS |
| | READ NAME | |
| Code | : | 1000 0010 + 0000 0000 (12 bytes) + CKS |
| Remarks | : | Request name |
| | SEND NAME | |
| Code | : | 1100 0010 + Name (12 characters) + CKS |
| Command | : | STATUS1 |
| Code | : | XX00 0011 |
| | WRITE STATUS1 | |
| Code | : | 0100 0011<br>+ Pet Select (2 bytes: character/body)<br>+ Age (1 byte)<br>+ Weight (2 bytes)<br>+ Health (1 byte)<br>+ STATA (1 byte)<br>+ STATB (1 byte)<br>+ STATC (1 byte)<br>+ Score (1 byte)<br>+ Training Index (1 byte)<br>+ Discipline Index (1 byte)<br>+ CKS (1 byte) |
| | READ STATUS1 | |
| Code | : | 1000 0011 + 0000 0000 (12 bytes) + CKS |
| | SEND STATUS1 | |
| Code | : | 1100 0011<br>+ Pet Select (2 bytes: character/body)<br>+ Age (1 byte)<br>+ weight (2 bytes)<br>+ Health (1 byte)<br>+ STATA (1 byte)<br>+ STATB (1 byte)<br>+ STATC (1 byte)<br>+ Score (1 byte)<br>+ Training Index (1 byte)<br>+ Discipline Index (1 byte)<br>+ CKS (1 byte) |
| Command | : | STATUS2 |
| Code | : | XX00 0100 |
| | WRITE STATUS2 | |
| Code | : | 0100 0100<br>+ Pet Select (2 bytes: Character/body)<br>+ Hungry Index (1 byte)<br>+ Sleep Index (1 byte)<br>+ Cleaning Index (1 byte)<br>+ Play Index (1 byte)<br>+ 0000 0000 (6 bytes)<br>+ CKS |
| | READ STATUS2 | |
| Code | : | 1000 0100 + 0000 0000 (12 bytes) + CKS |
| | SEND STATUS2 | |
| Code | : | 1100 0100<br>+ Pet Select (2 bytes: Character/body)<br>+ Hungry Index (1 byte)<br>+ Sleep Index (1 byte)<br>+ Cleaning Index (1 byte)<br>+ Play Index (1 byte)<br>+ 0000 0000 (6 bytes)<br>+ CKS |
| Command | : | RAM |
| Code | : | XX00 0101 |
| Remarks | : | This is allow read/write access of any parameters stored in GigaPet RAM. |
| | WRITE RAM | |
| Code | : | 0100 0101<br>+ RAM pointer (2 bytes, low byte first)<br>+ length (1 byte)<br>+ Content (9 bytes)<br>+ CKS |
| | READ RAM | |
| Code | : | 1000 0101<br>+ RAM pointer (2 bytes, low byte first)<br>+ length (1 byte)<br>+ 0000 0000 (9 bytes)<br>+ CKS |
| | SEND RAM | |
| Code | : | 1100 0101 + RAM pointer (2 bytes, low byte first)<br>+ length (1 byte)<br>+ Content (9 bytes)<br>+ CKS |
| Command | : | MESSAGE |
| Code | : | XX00 0110 |
| | WRITE MESSAGE | |
| Code | : | 0100 0110 + Message (12 characters) + CKS |
| Command | : | TERMINATION COMMAND |
| Code | : | XX00 0111 |
| Remarks | : | Use to terminate linking |
| | READ TERMINATION (Termination Request) | |
| Code | : | 1000 0111 + 0000 0000 (12 bytes) + CKS |
| | SEND TERMINATION (Termination Acknowledgment) | |
| Code | : | 1100 0111 + 0000 0000 (12 bytes) + CKS |
| Command | : | FIGHTING MODE |
| Code | : | XX00 1000 |
| Remarks | : | After the ack, the code will become non-14 bytes |
| | FIGHTING MODE request | |
| Code | : | 1000 1000 + byte + 0000 0000 (11 bytes) + CKS |
| | where byte = sender's ID | |
| | FIGHTING MODE ack | |
| Code | : | 1100 1000 + byte1 + byte2 + 0000 0000 (10 bytes) + CKS<br>where byte1 = sender's ID<br>byte2 = ID echo of other Pet |
| Command | : | FIGHT |
| Code | : | XX00 1001 or XX00 1010 or XX00 1011 |
| Remarks | : | Variable length commands, in fighting mode only |
| | SEND BUTTON | |
| Code | : | 1000 1001 + 0111 0110 + byte + CKS |
| Where byte stands for the status of the button (4 buttons) | | |
| bit 0 = Right Button | | |
| bit 1 = Enter Button | | |
| bit 2 = Mode Button | | |
| bit 3 = Left Button | | |
| | BUTTON ACK | |
| Code | : | 1100 1001 + 0011 0110 + byte + CKS |
| Where byte is the echo of the button status of the other Pet | | |
| | IMAGE REQUEST | |
| Code | : | 0100 1010 + 1011 0101 + byte + CKS |
| Where | | byte = 01 request half screen image<br>byte = 02 request full screen image |
| | IMAGE SENT | |
| Code | : | 1000 1010 + 0111 0101 + byte + CKS |
| Where | | byte = 01 sent half screen image<br>byte = 02 sent full screen image |
| | IMAGE ACK | |
| Code | : | 1100 1010 + 0011 0101 + byte + CKS |
| Where | | byte = 01 received half screen image<br>byte = 02 received full screen image |
| | WINNING | |
| Code | : | 1000 1011 + 0111 0100 + 0000 0000 + CKS |
| Remarks | : | The winning side sends out this command |

-continued

```
WINNING ACK
  Code    :   1100 1011 + 0011 0100 + 0000 0000
                  + CKS
FIGHTING TERMINATION REQUEST
  Code    :   1000 1100 + 0111 0011 + 0000 0000
                  + CKS
FIGHTING TERMINATION ACK
  Code    :   1100 1100 + 0011 0011 + 0000 0000
                  + CKS
```

While there have been illustrated and described particular embodiments of the invention, it will be appreciated that numerous changes and modifications will occur to those skilled in the art, and it is intended in the appended claims to cover all those changes and modifications which fall within the true spirit and scope of the invention.

What is claimed is:

1. A hand-held electronic game apparatus, comprising:
    a preprogrammed game stored in a memory, wherein the preprogrammed game provides for generating a character, for uniquely identifying the character and for modifying an attribute simulating growth or development of the character in accordance with a predetermined set of game functions and in accordance with an input command;
    an input device for receiving commands from a user for playing the preprogrammed game and generating an input command;
    a controller for executing the preprogrammed game, wherein the controller, during execution of the preprogrammed game and responsive to an input command, modifies the attribute of the character; and
    a communications unit for transmitting communication signals to, and receiving communication signals from, a remote controller for enabling communication between the remote controller and the controller.

2. The hand-held electronic game apparatus of claim 1, wherein the input device further comprises an audio receiver for receiving audio input commands from a user.

3. The hand-held electronic game apparatus of claim 1, wherein the preprogrammed game provides for interactive game play with a second character provided by a second preprogrammed game at a remote location when communication is enabled between the remote controller and the controller.

4. The hand-held electronic game apparatus of claim 1, wherein, during execution of the preprogrammed game, the controller stores data pertaining to the attribute, and when communication is enabled between the remote controller and the controller, the communications unit transmits the data to remote controller.

5. The hand-held electronic game apparatus of claim 1, wherein the controller, responsive to a communication signal comprising a modification command from the remote controller, modifies the preprogrammed game in accordance with the modification signal.

6. The hand-held electronic game apparatus of claim 5, wherein the controller, responsive to a communication signal comprising an unlock command from the remote controller, unlocks a hidden feature within the preprogrammed game.

7. The hand-held electronic game apparatus of claim 5, wherein the controller, responsive to a communication signal comprising an upgrade command from the remote controller, upgrades the preprogrammed game.

8. The hand-held electronic game apparatus of claim 5, wherein the controller, responsive to a communication signal comprising an input command from the remote controller, modifies the attribute of the character.

9. The hand-held electronic game apparatus of claim 1, wherein the controller, responsive to a communication signal comprising a multi-user mode command from the remote controller, executes the preprogrammed game in a multi-user mode enabling the character to interact with a similar character provided by a second preprogrammed game at the remote controller.

10. The hand-held electronic game apparatus of claim 9, wherein the remote controller comprises a second hand-held electronic game apparatus.

11. The hand-held electronic game apparatus of claim 1, wherein the communications link comprises an Internet connection for enabling communication between the remote controller and the controller over the Internet.

12. The hand-held electronic game apparatus of claim 1, wherein the communications link comprises a cable for interconnecting the electronic game apparatus with the remote controller.

13. A hand-held electronic game apparatus, comprising:
    a preprogrammed game stored in a memory, wherein the preprogrammed game provides a character having an attribute simulating growth or development of the character and which chances in accordance with an input command;
    an input device comprising an audio receiver for receiving audio commands from a user for generating an input command;
    a controller for executing the preprogrammed game, wherein the controller, during execution of the preprogrammed game and responsive to an input command, modifies the attribute of the character; and
    a communications unit for transmitting communication signals to, and receiving communication signals from, a remote controller for enabling communication between the remote controller and the controller.

14. The hand-held electronic game apparatus of claim 13, wherein the audio receiver comprises a microphone.

15. The hand-held electronic game apparatus of claim 13, wherein the preprogrammed game provides for interactive game play with a second character provided by a second preprogrammed game at a remote location when communication is enabled between the remote controller and the controller.

16. The hand-held electronic game apparatus of claim 13, wherein, during execution of the preprogrammed game, the controller stores data pertaining to the attribute, and when communication is enabled between the remote controller and the controller, the communications unit transmits the data to remote controller.

17. The hand-held electronic game apparatus of claim 13, wherein the preprogrammed game provides for generating a character, for uniquely identifying the character and for modifying an attribute of the character in accordance with a predetermined set of game functions.

18. The hand-held electronic game apparatus of claim 13, wherein the preprogrammed game provides for generating a character having at least one attribute, for modifying the attribute and for enabling the character to interact with a similar character provided by a second preprogrammed game executed by the remote controller.

19. The hand-held electronic game apparatus of claim 13, wherein the controller, responsive to a communication signal comprising a modification command from the remote controller, modifies the preprogrammed game in accordance with the modification signal.

20. The hand-held electronic game apparatus of claim 19, wherein the controller, responsive to a communication signal comprising an unlock command from the remote controller, unlocks a hidden feature within the preprogrammed game.

21. The hand-held electronic game apparatus of claim 19, wherein the controller, responsive to a communication signal comprising an upgrade command from the remote controller, upgrades the preprogrammed game.

22. The hand-held electronic game apparatus of claim 19, wherein the controller, responsive to a communication signal comprising an input command from the remote controller, modifies the attribute of the character.

23. The hand-held electronic game apparatus of claim 13, wherein the controller, responsive to a communication signal comprising a multi-user mode command from the remote controller, executes the preprogrammed game in a multi-user mode enabling the character to interact with a similar character provided by a second preprogrammed game at the remote controller.

24. The hand-held electronic game apparatus of claim 23, wherein the remote controller comprises a second hand-held electronic game apparatus.

25. The hand-held electronic game apparatus of claim 23, wherein the remote controller comprises a central processing unit at a remote location.

26. The hand-held electronic game apparatus of claim 13, further comprising a keyed input having a plurality of keys for inputting user commands.

27. The hand-held electronic game apparatus of claim 26, further comprising a display for displaying graphics and text images.

28. The hand-held electronic game apparatus of claim 13, wherein the communications link comprises an Internet connection for enabling communication between the remote controller and the controller over the Internet.

29. The hand-held electronic game apparatus of claim 13, wherein the communications link comprises a cable for interconnecting the electronic game apparatus with the remote controller.

30. The hand-held electronic game apparatus of claim 13, wherein the communications link further comprises a port for transferring and receiving information over a bi-directional communication link.

31. The hand-held electronic game apparatus of claim 30, wherein the bi-directional communication link comprises an Internet connection.

* * * * *

UNITED STATES PATENT AND TRADEMARK OFFICE
CERTIFICATE OF CORRECTION

PATENT NO. : 5,971,855
DATED : October 26, 1999
INVENTOR(S) : Victor Ng

It is certified that error appears in the above-identified patent and that said Letters Patent is hereby corrected as shown below:

Column 12, line 25, change "chances" to --changes--.

Signed and Sealed this

Sixteenth Day of May, 2000

Attest:

Q. TODD DICKINSON

*Attesting Officer*     *Director of Patents and Trademarks*